United States Patent [19]

Macdonald

[11] Patent Number: 5,064,043

[45] Date of Patent: Nov. 12, 1991

[54] VISION SYSTEM

[75] Inventor: John L. Macdonald, Cincinnati, Ohio

[73] Assignee: Cincinnati Incorporated, Ohio

[21] Appl. No.: 507,706

[22] Filed: Apr. 10, 1990

[51] Int. Cl.$^5$ ............................................. F16D 71/00
[52] U.S. Cl. ............................ 192/125 A; 192/116.5;
192/130; 192/84 P; 100/53
[58] Field of Search ................ 192/116.5, 125 A, 130,
192/84 P; 100/53

[56] References Cited

U.S. PATENT DOCUMENTS

| | | | |
|---|---|---|---|
| 1,455,795 | 5/1923 | Logan | 192/84 P X |
| 2,383,313 | 8/1945 | Hoffman et al. | 192/125 A |
| 3,172,156 | 3/1965 | Belden | 18/16.7 |
| 3,464,089 | 9/1969 | Smith | 18/16.7 |
| 3,619,065 | 11/1971 | Agnew | 356/120 |
| 3,804,270 | 4/1974 | Michaud et al. | 214/168 |
| 3,876,969 | 4/1975 | Price, Jr. | 192/130 |
| 3,878,745 | 4/1975 | Handziak et al. | 192/125 A |
| 3,905,317 | 9/1975 | Pacilio | 192/125 A |
| 3,947,734 | 3/1976 | Fyler | 192/130 |
| 4,120,389 | 10/1978 | Erickson | 192/130 |
| 4,175,448 | 11/1979 | Loew et al. | 192/84 P X |
| 4,281,342 | 7/1981 | Ueda et al. | 358/93 |
| 4,282,511 | 8/1981 | Southgate et al. | 340/146.3 |
| 4,344,146 | 8/1982 | Davis, Jr. et al. | 364/552 |
| 4,409,718 | 10/1983 | Pryor | 29/407 |
| 4,427,880 | 1/1984 | Kanade et al. | 250/222.1 |
| 4,660,703 | 4/1987 | Filcich et al. | 192/130 |
| 4,706,120 | 11/1987 | Slaughter et al. | 358/103 |
| 4,707,647 | 11/1987 | Coldren et al. | 318/568 |
| 4,760,444 | 7/1988 | Nielson et al. | 358/101 |

OTHER PUBLICATIONS

Hoffman Engineering, Save Those Hands, 4/15/1952.
"Image Digitizer Gives Computers Ability to See", Industrial-Research & Development, Sep., 1981, pp. 148-150.
"Image Sensors in System Design", Engineering Materials & Design, Sep., 1981, pp. 22-23.
"Machine Vision for Industrial Automation", Theory and Applications Unlimited Corporation, U.S. Patent and Trademark Office Scientific Library Acquisition, Oct. 1983.
Promotional Material from CSD International, Inc. entitled "Machine Vision for Your Personal Computer CSD-Vision TM" and MVI-Injection Mold Protection System (1989).
A publication entitled "Machine Vision Systems: A Summary and Forecast", published by Tech Tran Consultants, Inc., pp. 75-91 (1985).

Primary Examiner—Allan D. Herrmann
Assistant Examiner—Nicholas Whitelaw
Attorney, Agent, or Firm—Frost & Jacobs

[57] ABSTRACT

A vision system for detecting mispositioned parts during the operation of a powder metal press and preventing damage to the press and tooling associated therewith, wherein the gross level of light is read at specified locations of the press during predetermined points in the press stroke, compared to gross light levels established during a teaching stroke of the press, with the press being automatically deactivated when the difference between the gross light level read and the established gross light level is not within a predetermined range.

19 Claims, 4 Drawing Sheets

VISION SYSTEM

TECHNICAL FIELD

This invention relates to a vision system for detecting fault conditions during the operation of a device to prevent damage caused by overloads, and, more particularly, to a vision system for detecting mispositioned parts during the operation of a powder metal press and preventing damage to the press and tooling associated therewith, wherein the gross level of light is read at specified locations of the press during predetermined points in the press stroke and compared to gross light levels established during a teaching stroke of the press, with the press being automatically deactivated when the difference between the gross light level read and the established gross light level is not within a predetermined range.

BACKGROUND ART

One of the major costs in powder metal parts production, as well as other production performed by presses and coining/stamping devices, is that associated with damage to the press and tooling due to overloads. Oftentimes, these overloads are caused by previously formed parts being in the die area when the next part is formed. For example, this can occur if a formed part sticks to the upper punch of the press during ejection and then is brought directly back into the die cavity on the next press stroke.

Further, overloads to the press and tooling may be caused by a blockage of the stream of parts flowing from the press, which forces the last formed part to topple back into the die area. In some ways, this occurrence causes even more catastrophic results since this type of overload places eccentric forces on the tooling and press. Other scenarios which cause overloads include when the feeder mechanism fails and the powder shuttle (or other similar means) remains over the die area and when a part removal system (such as a robot or pick-and-place device) fails in the pick-up location or drops a part after picking it from the cavity.

Most earlier attempts at overload protection by the prior art have dealt with the problem in a gross manner, wherein the press was designed to be protected but not necessarily the tooling associated therewith. Examples of this type of protection include hydraulic capsules in the upper ram, shear plates in the driving mechanism, and hydraulically loaded tie rod nuts. These types of protection systems react directly to an overload on the press, stopping the machine and preventing a second stroke. In most of these cases, however, the tooling is already damaged or destroyed during the measured overload situation before the press could be stopped. In fact, the very nature of a mechanical press, which allows inertial forces to form parts at high speed with minimal horsepower input, makes it likewise impossible to stop the press instantaneously. Photoelectric cells have also been utilized with some success to detect improperly placed parts, but this type of system is relatively difficult to set up and keep clean, somewhat ineffective on very thin parts, and cannot easily be used to detect parts stuck to the upper punch.

More recently, vision systems have been developed for visual inspection applications of this type. The original cameras utilized in such vision systems were of the vidicon type, which are similar to those used in commercial videos. These cameras had a photoconductive surface on the end of the tube which was subject to "burn-in" problems when the camera was used to view a stationary field of vision. Also, the cameras had a very limited life due to shock and vibration problems inherent in applying them to a press. Programming these early systems was also difficult and the associated computer hardware was cumbersome and relatively slow. Moreover, lighting levels were particularly critical, especially when recognition of specific parts in their orientation was concerned.

During the early 1980's solid state cameras were developed using either charge-coupled device (CCD) or charge-injected device (CID) image sensors. These sensors are fabricated directly on silicon chips using integrated circuit technology, and consist of matrix arrays of small, accurately spaced photosensitive elements. When light passing the camera lens strikes such an array, each detector converts the portion of light falling upon it into an analog electrical signal. The entire image is thus broken into an array of individual picture elements known as "pixels." The magnitude of the analog voltage registered for each pixel is directly proportional to the intensity of light in that portion of the image. This voltage represents an "average" of the light intensity variation over the area of the pixel.

In general, solid state cameras offer several important advantages over vidicon cameras when utilized in the press environment. In addition to being smaller in size (recent design advancements include providing remote heads as small as 1 ¼"×2 ¼", allowing placement of cameras in difficult to access locations), they are much more rugged than the vidicon units. Further, the photosensitive surfaces in solid state cameras do not wear out with use as they do in vidicon cameras, thereby allowing the cost of these units to continue to decline.

Moreover, the vision systems employed today are complex and expensive, which is necessitated by their use in making specific identifications of parts and the like. Since the vision system of the present invention is designed only to recognize if some radical change in the gross or total light level in a scene is observed, it is simpler and less expensive than vision systems of the prior art.

DISCLOSURE OF THE INVENTION

It is an object of the present invention to provide a vision system for detecting fault conditions during the operation of a press and preventing damage to the press and associated tooling caused by overloads.

It is another object of the present invention to provide a vision system for detecting fault conditions during the operation of a press and automatically compensating for changes in ambient conditions affecting light level.

It is still another object of the present invention to provide a vision system for detecting fault conditions during the operation of a press and preventing damage to the press and associated tooling caused by overloads which is simple, programmable, and inexpensive.

In accordance with one aspect of the present invention, there is provided a vision system for detecting fault conditions during the operation of a mechanical powder metal press and preventing damage to the press and associated tooling caused by overloads. The mechanical powder metal press includes an upper punch and one or more lower punches, with one or more moveable die platens and a floating core-rod. A die area is provided within the die platens and includes a cavity where powder metal is provided by a feeder apparatus. During operation of the press, the die platens are brought vertically to create the die area so that the part may be formed by compaction. A vision system, including at least one camera, focuses on at least one specified location of the die area during predetermined times of the press stroke. Such cameras, which contain CCD or CID image sensors as described above, continuously view the specified locations, and at various points of the press stroke the press control causes a reading of the gross light level to be taken by each camera at its specified location. A vision circuit then compares the reading with the gross light level of the specified location taken during an initial or teaching stroke of the press. If the gross light level read at the predetermined points in the press stroke vary beyond preset and adjustable limits, a fault condition is established and the press stopped before damage to both the press and associated tooling can occur. Additionally, in order to detect and compensate for changes in ambient conditions affecting light levels, the vision system continuously averages readings of gross light levels taken over the most recent press strokes.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

The vision system of the present invention will be explained in conjunction with a mechanical powder metal press, although it may be utilized to protect the tooling on hydraulic compacting presses or on a variety of coining and sizing devices. In fact, the vision system of the present invention may be utilized in accordance with any device performing manufacturing operations where specific points in the cycle repeat continuously.

Figure 1:
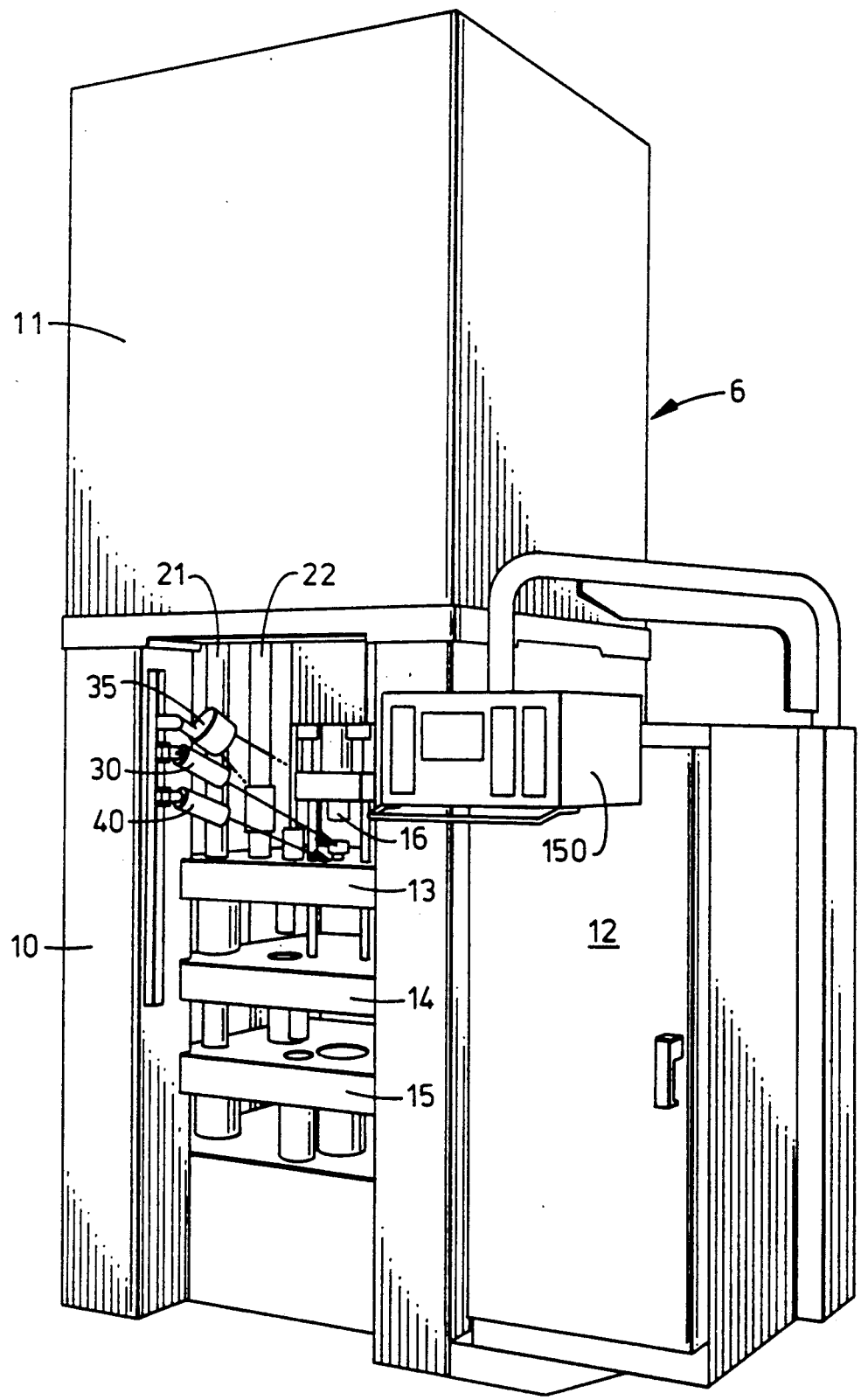
FIG. 1 is a general perspective view of a mechanical powder metal machine press in which the vision system of the present invention is utilized, as seen from the front.

Referring now to the drawings in detail, wherein like numerals indicate the same elements throughout the figures, FIG. 1 illustrates a mechanical powder metal press 6, as described in U.S. Pat. No. 3,172,156 to Belden, in which the present invention is utilized. A commercial example of mechanical powder metal press 6 is the Rigid-Reflex ® compacting press line manufactured by Cincinnati Incorporated of Cincinnati, Ohio. It will be understood, however, that other powder metal presses may utilize the present invention.

Compacting presses as such are well known and in general they include a die and some sort of a bottom element into which the powdered metal is fed. A ram or punch then compacts the powdered metal in the die under very high pressure. After the material has been compacted in the die, the article is ejected from the die and the completed article is then ready for subsequent treatment of any desired type.

More specifically, powder metal press 6 comprises a frame 10 and an upper casing 11 which houses the drive motor and eccentric mechanism (not shown) for a reciprocating upper punch 16, as well as the cam mechanism (not shown) for the downward movement of die platens 13, 14 and 15 during ejection (of course, more or fewer die platens may be utilized). Because the drive motor, eccentric mechanism, and cam mechanism are all well known in the art, they will not be described in detail. It will be understood, however, that upper punch 16 shall be provided with a suitable mechanism for moving it downwardly under heavy pressure, as may be accomplished by means of a drive shaft having an eccentric or by hydraulic or other suitable means (not shown).

A fixed lower punch is depicted at 17. A core punch 18 may be axially mounted within lower punch 17 to produce a tubular part and core punch 18 may be hydraulically actuated as for example by means of a piston 19 operating in a cylinder 20 and subjected to hydraulic pressure (see FIG. 3). Die platens 14 and 15 are floatingly mounted on heavy guide rods 21 and may be supported by pneumatic or hydraulic pressure as is known. Uppermost die platen 13 is floatingly supported on rods 22.

A cabinet 12 is mounted on the side of press 6 and houses a video circuit which shall be discussed in greater detail hereinafter. Further, a programmable control 150 is provided to set various operating characteristics of the video system, as desired by the press operator and discussed herein.

With respect to the operation of press 6, which is described in detail at column 5, lines 14–15 and column 6, lines 1–7 of U.S. Pat. 3,172,156, it will be understood that there are at least two points in the press cycle that bear inspection for mispositioned parts. The first point occurs immediately after feeder 96 fills cavity 98 with powder 97 and prior to upper punch 16 entering cavity 98 (see FIG. 3). At this point in the cycle, no part should be present within cavity 98. If a part is detected in this location, it must be a previously compacted part which has toppled backward due to a problem in the press out-flow system (shown as part 101).

Figure 3:
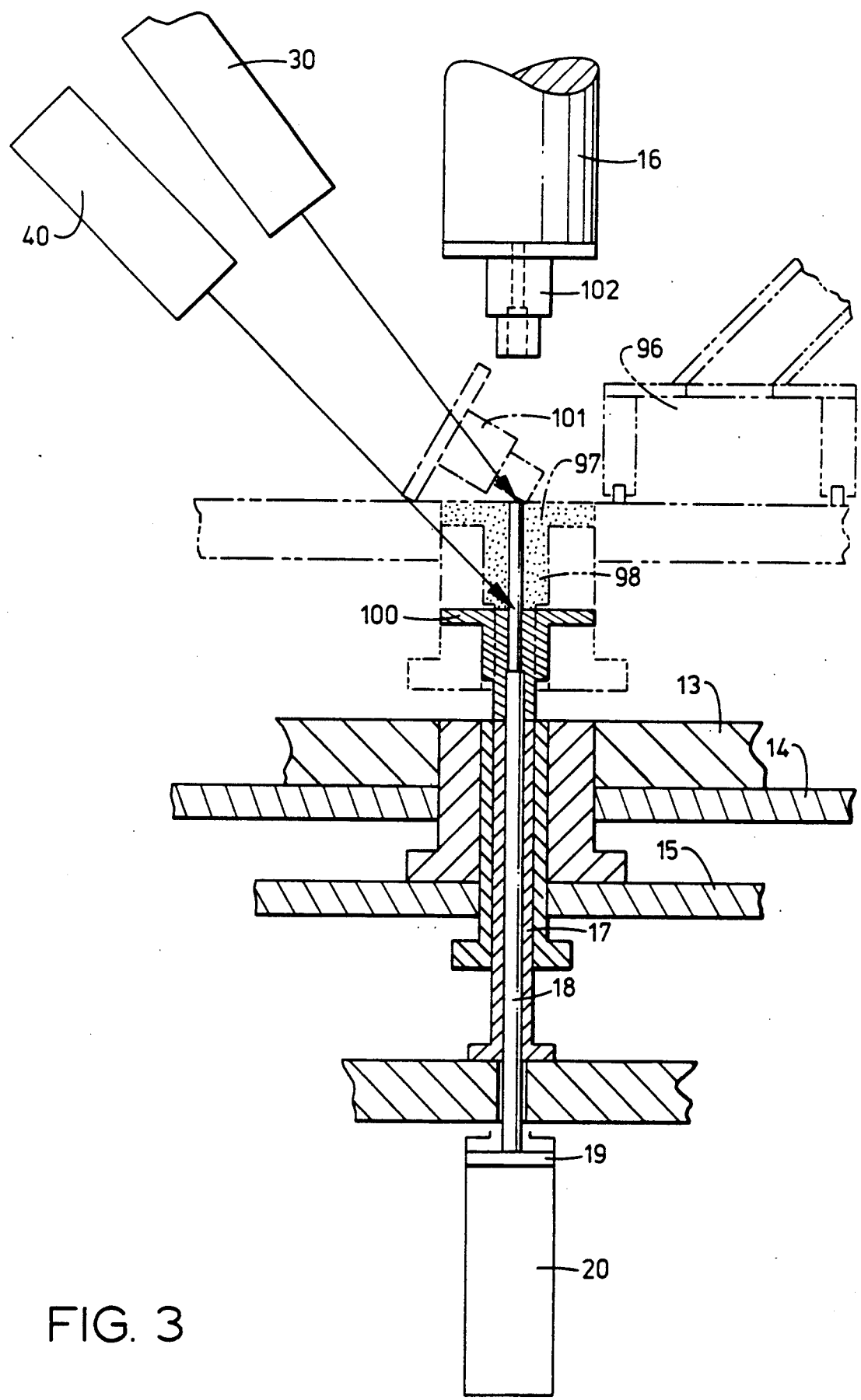
FIG. 3 is a diagrammatic representation showing the powder metal machine press just prior to compaction and just after ejection of a compacted part.

The second point in the press cycle which should be inspected for a mispositioned part occurs, as depicted in FIG. 3, immediately after ejection of a completed part 100 through retraction of die platens 13, 14, and 15, after which part 100 should be sitting on die area 99 waiting to be pushed off by feeder 96. If part 100 is not located within die area 99, it must be stuck on the bottom surface of upper punch 16 (shown as part 102). If not detected, an overload condition would obviously occur when upper punch 16 performs its next stroke.

It shall be understood by those knowledgeable in the art that the upstroke and downstroke of upper punch 16 corresponds to rotational movement of the eccentric from 0° to 180° and 180° to 360°, respectively. Accordingly, this relationship may be utilized to identify at what point in the overall stroke of upper punch 16 readings from cameras 30 and 40 should take place. With respect to the points of the stroke described herein, it is preferred that a reading by upper camera 30 occur after at a rotational angle of approximately 80° and a reading by lower camera 40 occur at a rotational angle of approximately 260°.

Figure 2:
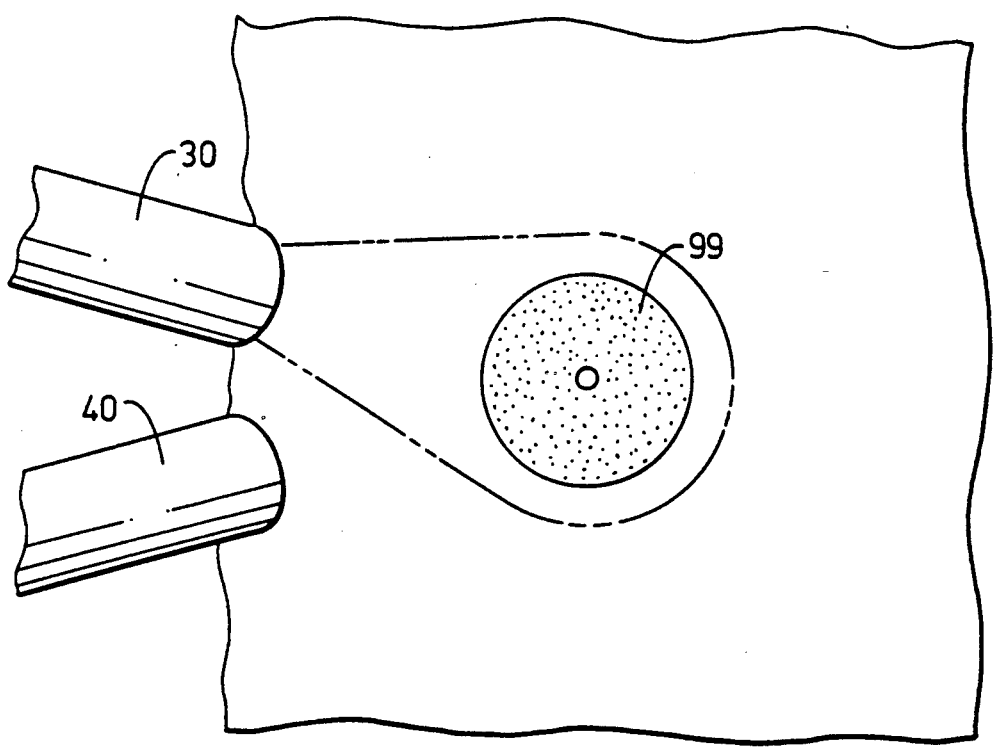
FIG. 2 is a diagrammatic representation of the die area of the powder metal machine press shown in FIG. 1.

It will be understood that the two points in the press cycle heretofore described are precisely repeatable regardless of the part configuration or operating speed of press 6. Accordingly, the gross light level observed at die area 99 (as seen in FIG. 2) at each of these points in the press cycle, when viewed by video cameras 30 and 40, exhibit a repeatable total level of light as measured by summing the outputs of all of the pixels (in the same manner as described for CCD and CID image sensors herein). Therefore, the total (or gross) level of light read will be radically different if a part is detected during the first point of inspection (when a part should not be present) or a part is not detected during the second point of inspection (when a part should be present).

As seen in FIG. 1, the vision system of the present invention includes an upper camera 30 and a lower camera 40 positioned adjacent to upper punch 16. Cameras 30 and 40 may preferably be bracketed to guide rods 21 to secure such position. Cameras 30 and 40 are focused generally on die area 99 (as best seen in FIG. 2), although upper camera 30 is aimed slightly higher than lower camera 40 since camera 30 is intended to view die area 99 when a part 100 is positioned there after ejection. Lower camera 40 is aimed slightly lower at die area 99 in order to verify that a part is not present prior to compaction by upper punch 16. A light source 35 is also preferably provided adjacent cameras 30 and 40 (as seen in FIG. 1) to better illuminate die area 99, as well as nullify the effects of ambient conditions somewhat.

An important aspect of the vision system of the present invention is that a teaching cycle is performed during the first stroke of the press cycle. During this first stroke, both camera 30 and camera 40 are triggered by press control 150 and the overall light level of the scene is established by means of video circuit 200. On every subsequent stroke of press 6, each camera "photographs" the scene again and video circuit 200 compares the light levels read with those recorded during the teaching stroke. If the gross light level detected during any subsequent stroke varies beyond preset and adjustable limits, a fault condition is established and press 6 is stopped before damage can occur to press 6 or the tooling utilized therewith.

Further, it will be understood that when press 6 operates during the teaching stroke, the "normal" light level for safe operation during the run of parts manufactured is established. In order to account for changes in ambient conditions during press operation, each reading taken is utilized to continuously update video circuit 200.

Figure 4:
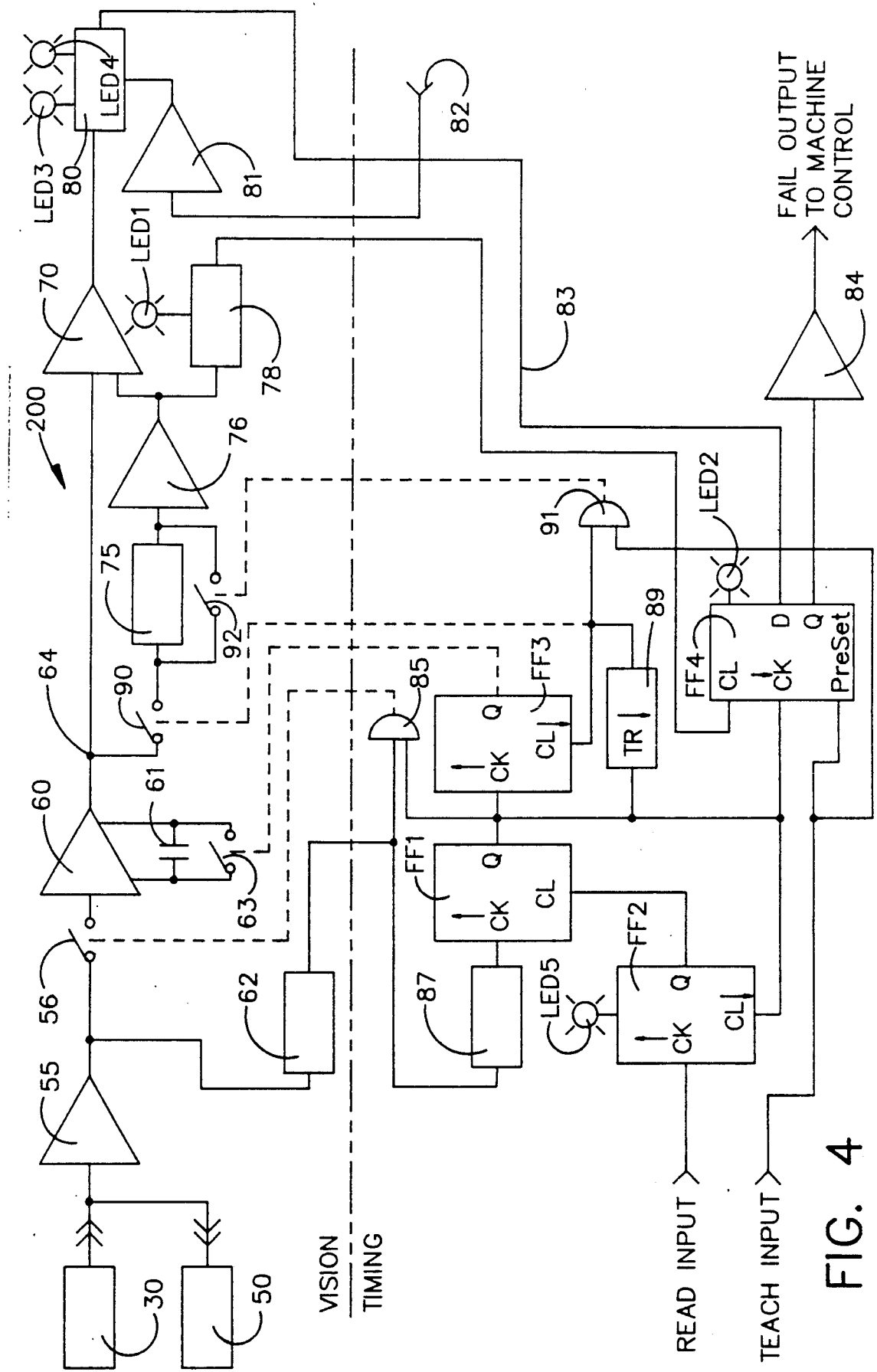
FIG. 4 is a schematic diagram of the vision circuit utilized with each camera in the vision system.

FIG. 4 depicts video circuit 200 in greater detail. As seen therein, it will be understood that video circuit 200 may be utilized with only a single camera 30. Thus, for each camera in the vision system, a separate and identical video circuit 200 is required. It will be understood by those skilled in the art that each camera and its corresponding video circuit may be interconnected so that several points in an operating cycle or stroke may be inspected and analyzed.

With respect to FIG. 4, camera 30 is connected to video circuit 200, which is powered by a standard 15 volt power supply located in cabinet 12 (not shown). A monitor 50 may also be connected between camera 30 and video circuit 200. Monitor 50 is used solely for aiming and focusing camera 30 since the actual picture scene in monitor 50 is incidental and has no direct bearing on the logic of video circuit 200. It will be understood that monitor 50 may be utilized for this function with all cameras of the vision system, as the reading of each camera will be taken at different points in the press stroke.

As seen in FIG. 4, a composite video signal from camera 30 is input to an amplifier 55 (in accordance with ANSI standard RS 170). This composite video signal contains all of the visual components of the camera reading, including vertical and horizontal synchronizing pulses. Once again, the signal from camera 30 is continuous throughout the stroke of press 6, but video circuit 200 (as programmed by press control 150) decides when to read it.

An electronic switch 56 is provided between amplifier 55 and an integrator 60. Switch 56 is utilized to separate the video information from the blanking and synchronizing pulses of the composite video signal such that only video information passes on to the input of integrator 60. Switch 56 opens and closes in conjunction with a synchronizing separator 62, whereby no video information is passed to synchronizing separator 62, but only blanking and synchronizing pulses. The function of synchronizing separator 62 and the timing of video circuit 200 shall be discussed in greater detail hereinafter.

Integrator 60 acts as an amplifier and is utilized to control the current accepted by an integrator capacitor 61. The amount of current allowed to pass to integrator capacitor 61 by integrator 60 is proportional to the total light level detected by camera 30. Thus, the greater the amount of light (or the more light at the scene inspected by camera 30), the greater the amount of current received for charging integrator capacitor 61. Switch 63 is provided in order to allow drain of the charge off integrator capacitor 61 after it has finished charging and the voltage output of integrator 60 is determined. This allows integrator capacitor 61 to reset to zero. It should also be noted that integrator 60 functions to hold the video information for a frame of the scene (where a frame is defined as all horizontal video information contained between vertical signals and within the viewing of the camera) so that the voltage from the output of integrator 60 may be fixed at point 64. With respect to the present invention, this fixed voltage level is preferably established within a range of 2.5 to 10 volts. This fixed voltage level is one input to a differential amplifier 70. The other input to differential amplifier 70 involves the averaging of the voltages received from integrator 60 during a predetermined number of strokes for the press operation. In fact, averager 75 performs as a slow integrator by preferably averaging the last 15 strokes of the press operation. A buffer 76 is provided at the output of averager 75 in order to power the drive circuitry thereof.

Besides supplying a second input to differential amplifier 70, the output from buffer 76 is supplied to a band gap comparator 78. Band gap comparator 78 is utilized to determine the presence of camera error by verifying that the voltage received is within the functional range of video circuit 200. For purposes of an exemplary showing, band gap comparator 78 signifies a camera error by illuminating LED 1 (CAM ERROR) if the voltage received is less than 2.5 or greater than 10 volts. This range corresponds to the range established at the output of integrator 60 at point 64. As can be seen in FIG. 4, the output of band gap comparator 78 is supplied to the clear pin CL of flip-flop FF4. By so doing, this causes flip-flop FF4 to light a FAIL signal represented by LED 2.

The output of differential amplifier 70 is inputted to a second band gap comparator 80. Band gap comparator 80 establishes the sensitivity of video circuit 200 as determined by a sensitivity band-set input 82 (after passing through a buffer 81) from press control 150. Sensitivity band-set input 82 may preferably be in the form of an adjustable potentiometer. With respect to the present press application, band-gap comparator 80 shall have a variable sensitivity depending upon the fixed voltage level established by the sensitivity control input. Generally, however, the sensitivity is established at 50% or greater, band-gap comparator 80 being set at 0.75 volts at 50% sensitivity. This means that should band-gap comparator 80 receive a difference in voltage of ±0.75 volts from differential amplifier 70, its output will travel along line 83 to input D of flip-flop FF4 and transfer the fault signal to output Q of flip-flop FF4 so that a fault signal is sent through buffer 84 to indicate a fault condition to press control 150.

LED 3 and LED 4 represent LIGHT and DARK lights, respectively. LED 3 indicates that the camera picture is too bright and will come on only during a reading. LED 4 is normally on, but should go out momentarily when the press passes the camera read degree if the light level is not too dark.

Having described generally the operation of the video portion of vision circuit 200, the timing portion of vision circuit 200 shall next be described. Synchronization separator 62, as described hereinabove, receives the blanking and synchronization pulses from the composite video signal provided at the output of amplifier 55. After separating out the horizontal and vertical blanking and synchronization portions of the signal, synchronization separator 62 provides one input to AND gate 85, the function of AND gate 85 being further described hereinafter. The output of synchronization separator 62 also is provided as an input to vertical synchronization separator 87, wherein only the vertical portion of the synchronization pulses is passed therethrough. The output of vertical synchronization separator 87 is then provided to the clock input CK of flip-flop FF1. Flip-flop FF1 normally remains in a clear state. However, this clear state of flip-flop FF1 is removed as the output Q of flip-flop FF2 changes state when provided with a READ INPUT signal from press control 150. (LED 5 flashes momentarily when a READ INPUT signal is received by flip-flop FF1). Accordingly, when the clear state of flip-flop FF1 is removed, the output Q thereof goes high with the next vertical edge of its clock input CK, and is provided as a second input to AND gate 85. Therefore, when AND gate 85 receives two high signals at its inputs, it causes switch 56 to close and allow video information to pass to integrator 60. With each horizontal blanking pulse, the input signal to AND gate 85 from synchronization separator 62 will open and close switch 56.

It will also be understood that output Q of flip-flop FF1 is provided to clock input CK of flip-flop FF3. As stated hereinabove, switch 63 is provided as a drain for integrator capacitor 62, wherein the charge stored from the previous video information is reset to zero. Output Q of flip-flop FF3 causes switch 63 to open when it receives the rising signal from output Q of flip-flop FF1. Once another vertical synchronization pulse is received at clock input CK of flip-flop FF1 from vertical synchronization separator 87, it causes output Q of flip-flop FF1 to go low and stop the gating of AND gate 85. This signifies that a frame of video information has been completed (i.e., at the lower right hand corner of a screen) and that a new frame of video information stored in integrator 60 is ready for comparison.

Three additional things occur in video circuit 200 when output Q of flip-flop FF1 goes low. First, flip-flop FF2 is cleared back to its original state. In doing so, output Q of flip-flop FF2 latches clear input CL of flip-flop FF1, which prevents flip-flop FF1 from further being clocked by vertical synchronization separator 87 until a new READ INPUT signal is initiated from press control 150 to clock input CK of flip-flop FF2.

Second, clock input CK of flip-flop FF4 is triggered, which transfers the status of the signal from band gap comparator 80 at input D of flip-flop FF4 to output Q thereof. If band gap comparator 80 detected the video frame condition (voltage from differential amplifier 70) outside the predetermined tolerance, a fault signal will be passed from output Q of flip-flop FF4 to an output buffer 84 and fail light LED 2 will be illuminated.

Third, a one-shot circuit 89 (preferably about 50 milliseconds in length) will have been triggered. The leading edge of the signal from the output of one-shot 89 is used to close an electronic switch 90 between integrator 60 and averager 75. This reading of the integrated video frame is used (as is all such frames read thereafter) to continuously update video circuit 200 on changes in ambient conditions since averager 75 averages the light levels read from the most recent strokes (preferably, the last fifteen strokes).

After the 50 millisecond pulse from the output of one-shot 89 has elapsed, the trailing edge thereof turns off electronic switch 90, flip-flop FF3 is reset by means of its clear input CL, and output Q of flip-flop FF3 closes electronic switch 63 across integrator capacitor 61. Integrator capacitor 61 will then remain discharged until a new READ INPUT command is received from press control 150.

In order to have a means for comparing the scene at die area 99 of press 6 for a number of subsequent strokes thereof, a TEACH INPUT signal from press control 150 is provided to record the video information of the scene during the first stroke of press 6. Therefore, when this teach input is implemented, it is input into flip-flop FF4 at the PRESET to prevent giving off a fault condition signal during the teach stroke. A line bypasses flip-flop FF4 and is an input to AND gate 91. The other input to AND gate 91 comes from the output of one-shot circuit 89. When each of these inputs is high, it causes an output from AND gate 91 which closes switch 92. Closing of switch 92 causes a bypass of averager 75 so that averager 75 is updated with each video frame instead of requiring a predetermined number of press strokes.

Having shown and described the preferred embodiments of the present invention, further adaptations of the vision system for detecting fault conditions in the operation of a press or similar device can be accomplished by appropriate modifications by one of ordinary skill in the art without departing from the scope of the invention.

What is claimed is:

1. A vision system for detecting a fault condition in a machine which repeats identical production cycles of operation, said vision system comprising:
    (a) first means for determining a gross level of reflected light reflected from a predetermined location within said machine at a predetermined point during said production cycle, said first means being operable during a teach cycle and thereafter during each production cycle;

(b) second means for comparing the gross level of reflected light determined during a production cycle with the gross level of reflected light determined during said teach cycle; and (c) third means for inhibiting the operation of said machine when the gross level of reflected light determined during a production cycle differs from the gross level of reflected light determined during said teach cycle by more than a predetermined amount.

2. A vision system as recited in claim 1, wherein said first means for determining a gross level of reflected light includes:

(a) means for creating a composite video signal representative of said reflected light, said composite video signal including a plurality of lines of video information, blanking pulses, and synchronizing pulses;

(b) means for selectively switching, according to a predetermined pattern, said composite video signal such that said lines of video information are separated from said blanking pulses and said synchronizing pulses; and (c) means for integrating each of said lines of video information until a frame representative of said gross level of reflected light exists at the output of said means for integrating.

3. A vision system as recited in claim 2, wherein said means for creating a composite video signal includes an array of closely and accurately spaced light sensitive elements.

4. A vision system as recited in claim 3, wherein said light sensitive elements consist of Charge-Coupled Devices.

5. A vision system as recited in claim 3, wherein said light sensitive elements consist of Charge-Injected Devices.

6. A vision system as recited in claim 1, wherein said second means for comparing the gross level of reflected light determined during a production cycle with the gross level of reflected light determined during said teach cycle includes:

means for transforming and maintaining said gross level of reflected light determined during the teach cycle, thus creating a held gross level of reflected light signal;

(b) means for comparing said held gross level of reflected light signal to predetermined upper and lower process limits, and determining whether said held gross level of reflected light signal falls within said upper and lower process limits;

(c) means for subtracting said held gross level of reflected light signal from said gross level of reflected light determined during a previous production cycle, thus creating a difference signal;

(d) means for comparing said difference signal to light and dark limits, and determining whether said difference signal falls within said light and dark limits; and (e) means for adjusting the sensitivity of said light and dark limits.

7. A vision system as recited in claim 1, wherein said machine is a powdered metal press.

8. A vision system as recited in claim 1, further comprising a light source placed in close proximity to said vision system.

9. A vision system for detecting a fault condition in a machine which repeats identical production cycles of operation, said vision system comprising:

(a) first means for determining a gross level of reflected light reflected from a predetermined location with said machine at a predetermined point during said production cycle, said first means being operable during a teach cycle and thereafter during each production cycle;

(b) second means for determining the average value of the gross level of reflected light for a predetermined number of previous production cycles, said second means including an averaging circuit;

(c) third means for comparing the gross level of reflected light determined during a production cycle with the averaged gross level of reflected light determined by said averaging circuit; and (d) fourth means for inhibiting the operation of said machine when the gross level of reflected light determined during a production cycle differs from the averaged gross level of reflected light determined by said averaging circuit by more than a predetermined amount.

10. A vision system as recited in claim 9, wherein said first means for determining a gross level of reflected light includes:

(a) means for creating a composite video signal representative of said reflected light, said composite video signal including a plurality of lines of video information, blanking pulses, and synchronizing pulses;

(b) means for selectively switching, according to a predetermined pattern, said composite video signal such that said lines of video information are separated from said blanking pulses and said synchronizing pulses; and (c) means for integrating each of said lines of video information until a frame representative of said gross level of reflected light exists at the output of said means for integrating.

11. A vision system as recited in claim 10, wherein said means for creating a composite video signal includes an array of closely and accurately spaced light sensitive elements.

12. A vision system as recited in claim 11, wherein said light sensitive elements consist of Charge-Coupled Devices.

13. A vision system as recited in claim 11, wherein said light sensitive elements consist of Charge-Injected Devices.

14. A vision system as recited in claim 9, wherein said second means for determining the average value of the gross level of reflected light for a predetermined number of the most recent production cycles includes:

(a) means for transforming said gross level of reflected light determined during said production cycle, thus creating a gross level of reflected light signal;

(b) means for switching at a predetermined time in each production cycle said gross level of reflected light signal, thus creating a switched reflected light signal; and (c) means for averaging said switched reflected light signal over a predetermined number of previous production cycles, thus creating an averaged gross level of reflected light signal.

15. A vision system as recited in claim 9, wherein said third means for comparing the gross level of reflected light determined during a production cycle with the gross level of reflected light determined by said averaging circuit includes:

means for transforming and maintaining said gross level of reflected light determined by the averaging circuit, thus creating a held gross level of reflected light signal;

(b) means for comparing said held gross level of reflected light signal to predetermined upper and lower process limits, and determining whether said held gross level of reflected light signal falls within said upper and lower process limits;

(c) means for subtracting said held gross level of reflected light signal from said gross level of reflected light determined during a previous production cycle, thus creating a difference signal;

(d) means for comparing said difference signal to light and dark limits, and determining whether said difference signal falls within said light and dark limits; and (e) means for adjusting the sensitivity of said light and dark limits to be adjusted.

16. A vision system as recited in claim 9, wherein said machine is a powdered metal press.

17. A vision system as recited in claim 9, further comprising a light source placed in close proximity to said vision system.

18. A method for detecting a fault condition in a machine which repeats identical production cycles of operation, which comprises the steps of:

(a) determining a gross level of reflected light reflected from a predetermined location within said machine at a predetermined point during said production cycle, the determination occurring during a teach cycle and thereafter during each production cycle;

(b) comparing the gross level of reflected light determined during a production cycle with the gross level of reflected light determined during said teach cycle; and (c) inhibiting the operation of said machine when the gross level of reflected light determined during a production cycle differs from the gross level of reflected light determined during said teach cycle by more than a predetermined amount.

19. A method for detecting a fault condition in a machine which repeats identical production cycles of operation, which comprises the steps of:

(a) determining a gross level of reflected light reflected from a predetermined location within said machine at a predetermined point during said production cycle, the determination occurring during a teach cycle and thereafter during each production cycle;

(b) determining the average value of the gross level of reflected light for a predetermined number of previous production cycles;

(c) comparing the gross level of reflected light determined during a production cycle with the average value of the gross level of reflected light; and (d) inhibiting the operation of said machine when the gross level of reflected light determined during a production cycle differs from the average value of the gross level of reflected light by more than a predetermined amount.

* * * * *